United States Patent
Osano et al.

(10) Patent No.: US 7,814,356 B2
(45) Date of Patent: Oct. 12, 2010

(54) APPARATUS AND CONTROL METHOD FOR INITIALIZING A PHASE ADJUSTING PART IN RESPONSE TO A POWER SUPPLY CUT SIGNAL

(75) Inventors: Hidekazu Osano, Kawasaki (JP); Hiroshi Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 11/790,260

(22) Filed: Apr. 24, 2007

(65) Prior Publication Data

US 2008/0046769 A1 Feb. 21, 2008

(30) Foreign Application Priority Data

Aug. 18, 2006 (JP) .............................. 2006-223279

(51) Int. Cl.
| | |
|---|---|
| G06F 1/00 | (2006.01) |
| G06F 1/26 | (2006.01) |
| G06F 1/32 | (2006.01) |
| G06F 1/12 | (2006.01) |
| G06F 1/24 | (2006.01) |
| H04L 7/00 | (2006.01) |

(52) U.S. Cl. ...................... 713/324; 713/300; 713/320; 713/400; 713/500; 713/503

(58) Field of Classification Search ................ 713/300, 713/320, 324, 400, 500, 503
See application file for complete search history.

(56) References Cited

U.S. PATENT DOCUMENTS

| | | | |
|---|---|---|---|
| 5,793,987 A | 8/1998 | Quackenbush et al. | |
| 6,043,677 A | 3/2000 | Albu et al. | |
| 6,198,689 B1 | 3/2001 | Yamazaki et al. | |
| 6,208,667 B1 * | 3/2001 | Caldara et al. | ............... 370/503 |
| 6,317,442 B1 * | 11/2001 | Ngai | ........................... 370/518 |
| 6,636,932 B1 * | 10/2003 | Regev et al. | ................. 710/317 |

(Continued)

FOREIGN PATENT DOCUMENTS

EP 1 227 402 7/2002

(Continued)

OTHER PUBLICATIONS

Extended European Search Report, mailed Dec. 27, 2007 and issued in corresponding European Patent Application No. 07106271.5-1245.

(Continued)

*Primary Examiner*—Ji H Bae
(74) *Attorney, Agent, or Firm*—Fujitsu Patent Center

(57) ABSTRACT

A mutual electrically connecting part mutually connects a plurality of information processing parts, wherein the mutual connecting part comprises a phase adjusting part configured to adjust a phase from each of the respective ones of the plurality of information processing parts; and the mutual connecting part further has a power supply cut signal transmitting part transmitting a power supply cut signal, indicating that power supply to any one of the plurality of information processing parts is cut, to the phase adjusting part corresponding to the information processing part; and an initializing part initializing the phase adjusting part corresponding to the information proceeding part for which power supply is cut, in response to the transmission of the power supply cut signal from the power supply cut signal transmitting part.

13 Claims, 8 Drawing Sheets

U.S. PATENT DOCUMENTS

| | | | |
|---|---|---|---|
| 7,194,651 B2 * | 3/2007 | Knee et al. | 713/500 |
| 7,290,162 B2 * | 10/2007 | Swarbrick et al. | 713/500 |
| 2001/0025332 A1 | 9/2001 | Wang et al. | |
| 2002/0128815 A1 | 9/2002 | Merchant et al. | |
| 2006/0018312 A1 * | 1/2006 | Osano et al. | 370/380 |
| 2006/0209820 A1 * | 9/2006 | Arai et al. | 370/389 |
| 2007/0064852 A1 * | 3/2007 | Jones et al. | 375/356 |
| 2008/0007928 A1 * | 1/2008 | Salama et al. | 361/784 |

FOREIGN PATENT DOCUMENTS

| | | |
|---|---|---|
| JP | 08-063264 | 3/1996 |
| JP | 2000-163963 | 6/2000 |
| WO | 02/29975 | 4/2002 |

OTHER PUBLICATIONS

Extended European Search Report issued in corresponding European Patent Application No. 07106271.5 on Apr. 28, 2008.

* cited by examiner

APPARATUS AND CONTROL METHOD FOR INITIALIZING A PHASE ADJUSTING PART IN RESPONSE TO A POWER SUPPLY CUT SIGNAL

BACKGROUND OF THE INVENTION

1. Field of the Invention

The present invention relates to an information processing apparatus and a control method therefor, and, in particular, to an information processing apparatus having a plurality of information processing parts, with a phase adjusting device provided for each thereof, and a control method thereof.

2. Description of the Related Art

For example, in a data transmission system in which data transmission is carried out among a plurality of integrated circuits such as LSI circuits, a configuration is known in which flip-flop circuit devices or such are used on a reception side, a data signal and a clock signal, i.e., a timing signal, are received there. On the reception side, the data signal is taken in timing of the clock signal (see Japanese Laid-Open Patent Application 2000-163963).

In this case, in order that the flip-flop circuit device can positively take the received data signal, input of the data signal should be carried out in such a timing avoiding a set-up time and a hold time of the clock signal as well-known. For this purpose, such a control should be carried out that a phase between the data signal and the clock signal may meet predetermined requirements. For this purpose, a phase adjusting device may be provided on a signal receiving part, as a well-known art.

In this phase adjusting device, in order to adjust the phase relationship between the received data signal and the received clock signal by means of a phase adjusting operation, any one of the data signal and the clock signal is delayed. After the phase relationship therebetween becomes thus meeting the predetermined requirements through such a phase adjusting operation, an operation of actually taking the data signal is carried out by the above-mentioned flip-flop circuit device is started.

Such a phase adjusting operation in the reception-side LSI circuit is carried out regularly during data transmission. As to the phase adjusting operation, merely a slight phase error correction is required when the signal transmission condition is stable. However, in a case where a phase adjustment is carried out when power supply is started in a transmission-side LSI circuit for example, a certain time period may be required until such a stable signal transmission condition is reached.

SUMMARY OF THE INVENTION

The present invention has been devised in consideration of such a situation, and an object of the present invention is to provide such a configuration that, in an information processing apparatus having a plurality of information processing parts, for each of which a phase adjusting device is provided, a time required for initial phase adjustment to be carried out after replacement of one of the plurality of information processing parts, if any, can be effectively shortened.

According to the present invention, when power supply in one of a plurality of information processing parts is cut, a power supply cut signal is transmitted to a corresponding phase adjusting device in a mutual connecting part which is configured to mutually connect the plurality of information processing parts, and, in response thereto, the phase adjusting device corresponding to the one of the plurality of information processing parts is initialized.

By providing the configuration, when the one of the plurality of information processing parts is replaced, the power supply cut signal concerning the one of the plurality of information processing parts is provided, and thereby, the corresponding phase adjusting device is initialized.

According to the present invention, when the one of the plurality of information processing parts is replaced, the corresponding phase adjusting device is initialized by means of the power supply cut signal corresponding to the one of the plurality of information processing parts. Thus, the corresponding phase adjusting device is initialized separately. As a result, cutting power supply to the mutual connecting part body itself is not required. Also, thanks to the initialization of the phase adjusting device, a time required for an initial phase adjustment for the one of the plurality of information processing parts after the replacement can be effectively reduced.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

Figure 1A:
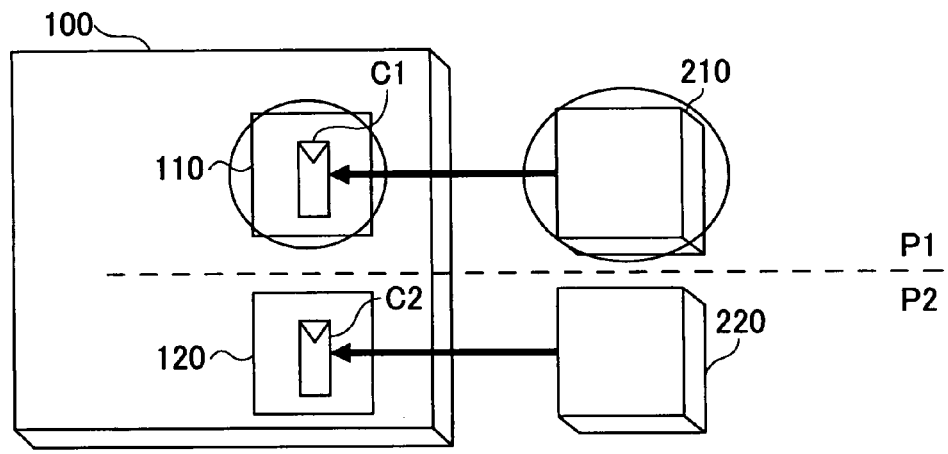
FIGS. 1A through 1C and 2 illustrate a situation in a related art.

With reference to figures, embodiments of the present invention will now be described.

It is assumed that one of boards on each of which a transmission-side LSI circuit is mounted is replaced by a new one, in a data transmission system configured to carry out data transmission among a plurality integrated circuits such as LSI circuits. In this case, an initial phase adjustment is carried out in a reception-side LSI circuit when power supply to the transmission-side LSI circuit is started after the board replacement. At this time, a phase adjustment state of a phase adjusting device provided in the reception-side LSI circuit for phase adjustment is one the same as that having appeared before the board replacement.

The phase adjusting device, made of, for example, using a DLL, a delay line or such, as mentioned later, provides a predetermined amount of delay to a given signal. The predetermined amount of delay is adjustable so that a phase adjustment of the given signal can be achieved. The adjustable predetermined amount of delay corresponds to the above-mentioned phase adjustment state of the phase adjusting device, in the above-mentioned example.

A long time may be required until the initial phase adjustment is finished in comparison to a case where the initial phase adjustment is carried out once the phase adjustment state is initialized. In such a case, a relatively long time may be required, from a start of power supply to the transmission-side LSI circuit after the board replacement, until the data transmission condition becomes stable.

In the above-mentioned initialization of the phase adjustment state of the phase adjusting device, a medium value of the phase adjusting range is set as an initial value of the phase adjusting operation first automatically. As a result, in the actual phase adjusting operation, the maximum required amount of phase adjustment amounts to the half of the phase adjusting range. On the other hand, if such an initialization is not carried out, and also, the phase adjustment state upon the above-mentioned board replacement is, by accident, approximately the maximum value of the phase adjusting range for example, the maximum required amount of phase adjustment amounts to approximately the full span of the phase adjusting range.

This is because, once the phase adjustment state is initialized to the medium value of the phase adjusting range, actual phase adjusting operation can be made in either of both directions by an equal amount. In contrast thereto, when such an initialization is not carried out and the phase adjustment state is by accident at the smallest or the largest end point of the phase adjusting range for example, an actual phase adjusting operation can be made only in one direction.

For example, it is assumed that a current phase adjustment state of the phase adjusting device is, by accident, at the largest end point of the phase adjusting range, and a current phase error to be corrected is such that, for example, merely a phase adjustment of slightly increasing the current phase amount is required. In such a case, the phase adjustment of slightly increasing the current phase amount is not possible since, as mentioned above, the current phase adjustment state is at the largest end point. In this case, such a phase adjusting operation as to decrease the phase amount for approximately the full span of the phase adjusting range is required. In contrast thereto, when the phase adjustment state of the phase adjusting device is once initialized to the medium point of the phase adjusting range, the phase adjustment of slightly increasing the current phase amount is possible since, in this case, the current phase adjustment state is at the medium point. In this case, merely such a phase adjusting operation as to slightly increase the phase amount is required. Thus, initialization of the phase adjustment state of the phase adjusting device to the medium point is advantageous.

Accordingly, by once initializing the phase adjustment state of the phase adjusting device, it is possible to effectively reduce a required time for a phase adjustment, i.e., effectively shorten a time required until a data transmission condition becomes stable.

As a method of reducing a time required for an initial phase adjustment in the related art, power supply to a reception side LSI circuit is cut. That is, generally speaking, a phase adjusting device has such a design that, once power supply to a corresponding LSI circuit is cut, its phase adjustment state is initialized or reset automatically. Accordingly, it is possible to forcibly initialize the phase adjusting device by once cutting the power supply to the corresponding reception-side LSI circuit.

However, in this method of the related art, power supply to all the LSI circuits (i.e., boards on which the LSI circuits are mounted), connected to the reception-side LSI circuit (for example, a crossbar switch), is inevitably cut simultaneously. As a result, all the information processing currently executed by these boards even other than the board to be replaced is inevitably interrupted. Such a situation is not preferable in view of total system operation.

In an embodiment of the present invention, it is possible to reduce a time required, from a start of power supply to a transmission-side LSI circuit after board replacement, until a data transmission condition becomes stable through the initial phase adjustment, even without cutting power supply to all the LSI circuits (i.e., the boards mounting the LSI circuits) connected to the reception-side LSI circuit (i.e., the crossbar switch), when the board mounting the transmission-side LSI circuit is replaced.

That is, according to the embodiment of the present invention, in a computer system in which a plurality of boards are connected (i.e., mounted) to a crossbar switch which acts as a reception-side LSI circuit (see FIG. 5) using phase adjusting devices, an initial phase adjustment upon replacement of a board connected to the crossbar switch is made more efficient, in a state in which power supply to the crossbar switch body is kept alive.

In the related art, when the board connected to the crossbar switch is replaced in a condition in which power supply to the crossbar body using the phase adjusting devices is kept alive, the phase adjustment states of the phase adjusting devices of the crossbar switch are not initialized. As a result, a time may be required for the initial phase adjustment after the board replacement, and the work efficiency may degrade accordingly, as mentioned above.

Figure 1B:
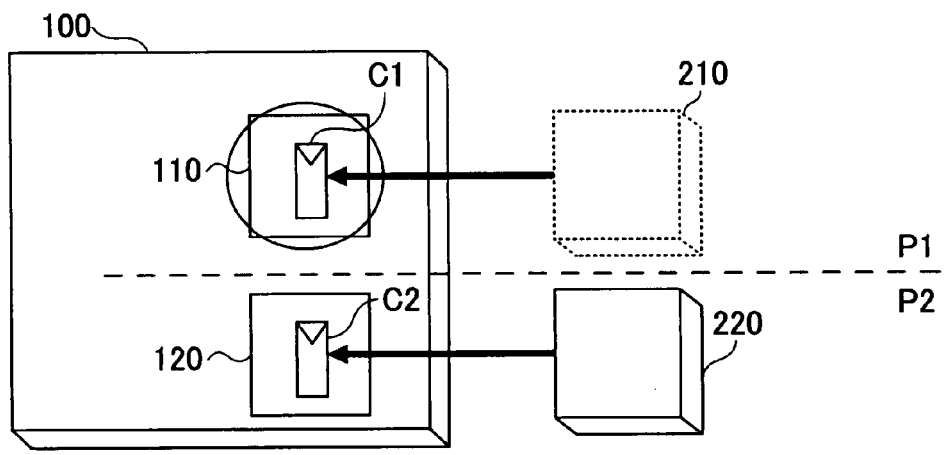
Figure 1C:
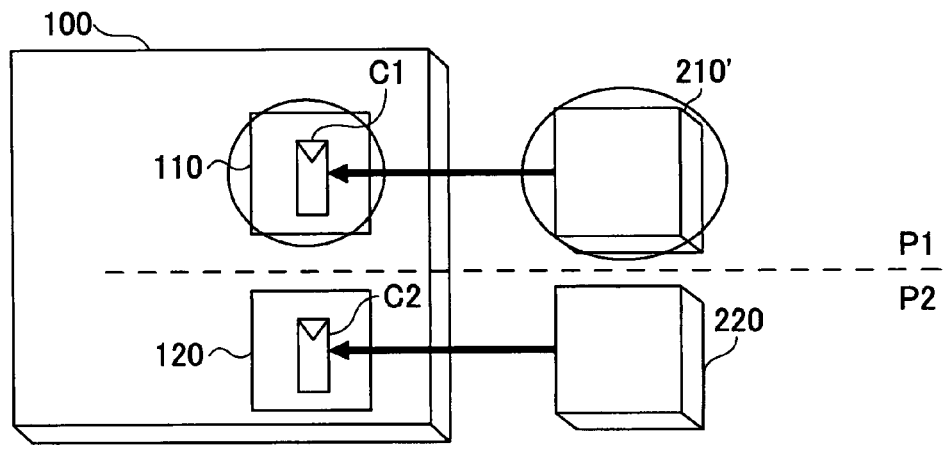

FIGS. 1A through 1C are used to illustrate this problem in the related art.

In a system shown in FIG. 1A, two boards 210 and 220 belonging to different partitions P1 and P2, respectively, are mounted to a crossbar switch 100. Special phase adjusting devices C1 and C2 are provided for the respective ones of the boards 210 and 220 in respective corresponding ports 110 and 120 of the crossbar switch 100.

FIG. 1B shows a state in which the board 210 is replaced by a new one. As shown in FIG. 1B, when the board 210 is replaced in a hot plug manner, the phase adjustment state of the phase adjusting device C1 of the port 110 corresponding to the board 210 is not initialized, and thus, a state before the board replacement is kept as it is. FIG. 1C shows a state in which a new board 210' is mounted instead of the existing board 210. In an initial phase adjustment carried out when the new board 210' is thus mounted as shown in FIG. 1C in a condition in which the phase adjustment state of the phase adjusting device C1 is not initialized as mentioned above, the phase adjustment state before the board replacement is kept as it is in the phase adjusting device C1. According, in comparison to a case where the phase adjustment state in the phase adjusting device C1 is initialized, a time required for the initial phase adjustment may increase as mentioned above.

As mentioned above, by carrying out the board replacement after power supply to the crossbar switch body 100 itself is cut in the related art, the phase adjustment states of the phase adjusting devices C1 and C2 are initialized forcibly. Thereby, a time required for the initial phase adjustment after the board replacement can be reduced.

Figure 2:
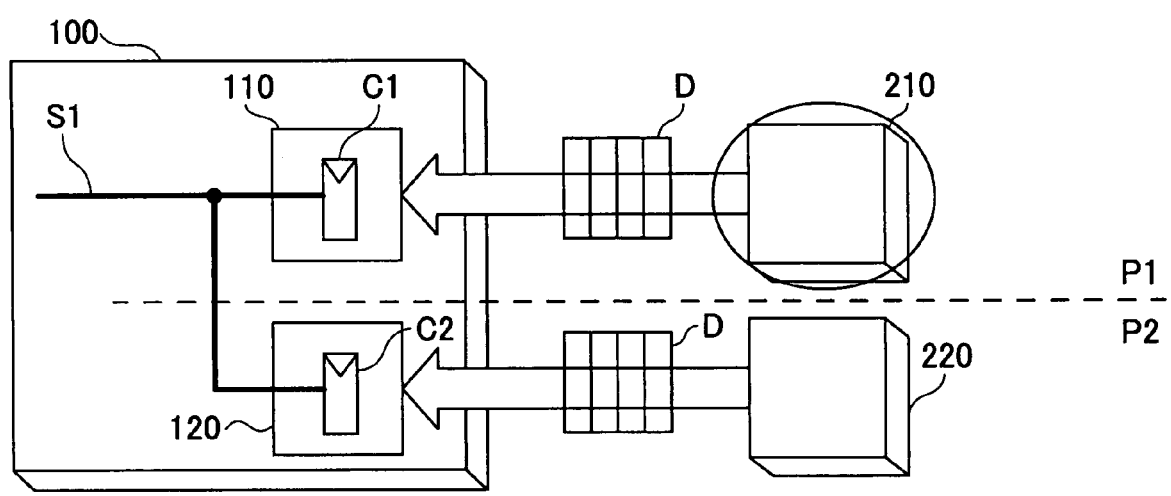

FIG. 2 illustrates this case.

As shown in FIG. 2, when power supply to the crossbar switch body 100 itself is cut, all the flip-flop circuit devices are initialized by a predetermined initializing signal through a signal line S1. That is, the initializing signal transmitted via the signal line S1 has a function as a reset signal for forcibly initializing the phase adjustment states of the phase adjusting devices C1 and C2 included in the crossbar switch 100. Accordingly, by the reset signal function of the initializing signal of the signal line S1 (referred to as the initializing signal line S1, hereinafter), the phase adjustment states of the respective phase adjusting devices C1 and C2, included in the crossbar switch 100, are forcibly initialized. In FIG. 2, data packets D transmitted to the crossbar switch 100 from the respective boards 210 and 220 are shown.

However, in the above-described method of FIG. 2 in the related art, initialization of the phase adjusting devices C1 and C2 is achieved as a result of power supply to the crossbar switch 100 being cut. Accordingly, for the system having the plurality of partitions P1 and P2, and having the plurality of information processing parts (i.e., the above-mentioned boards 210 and 220) connected to the crossbar switch 100, power supply to the partition P2, other than the partition P1 corresponding to the board replacement is also simultaneously cut inevitably, as a result of power supply to the crossbar switch 100 being thus cut. As a result, information processing currently executed by the board 220, irrelevant to the board replacement, is inevitably interrupted accordingly. This situation is not preferable in view of total system operation.

In contrast thereto, according to the embodiment of the present invention, a control is made such that, the phase adjustment state only of the phase adjusting device corresponding to the board to be replaced is initialized, in a condition in which power supply to the crossbar switch body itself is kept alive, and thus, operations of the parts other than the partition to which the board to be replaced belongs are kept continuous. As a result, it is possible to improve the efficiency of the initial phase adjustment upon the board replacement.

Figure 3A:
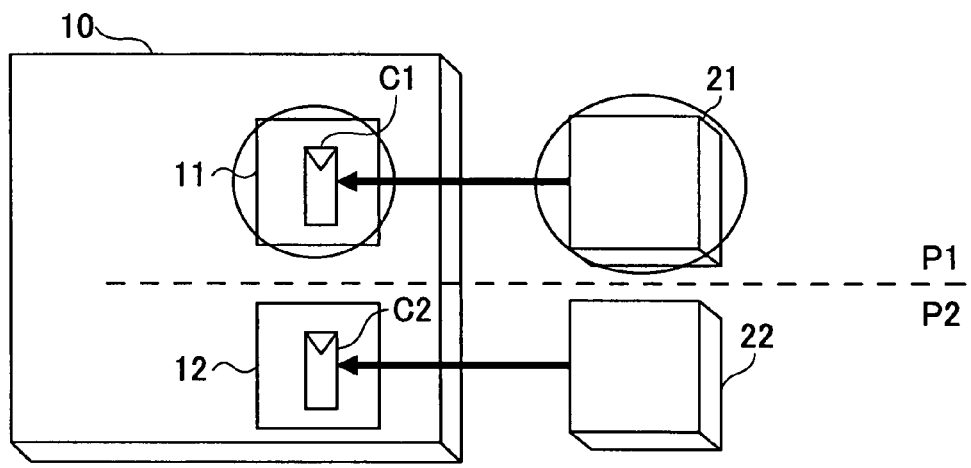
FIGS. 3A through 3C and 4 illustrate a concept of one embodiment of the present invention.
Figure 3B:
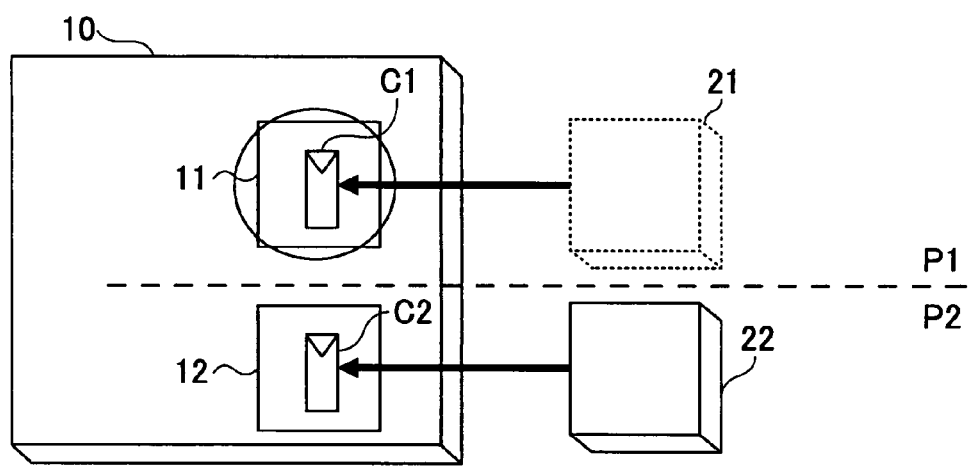
Figure 3C:
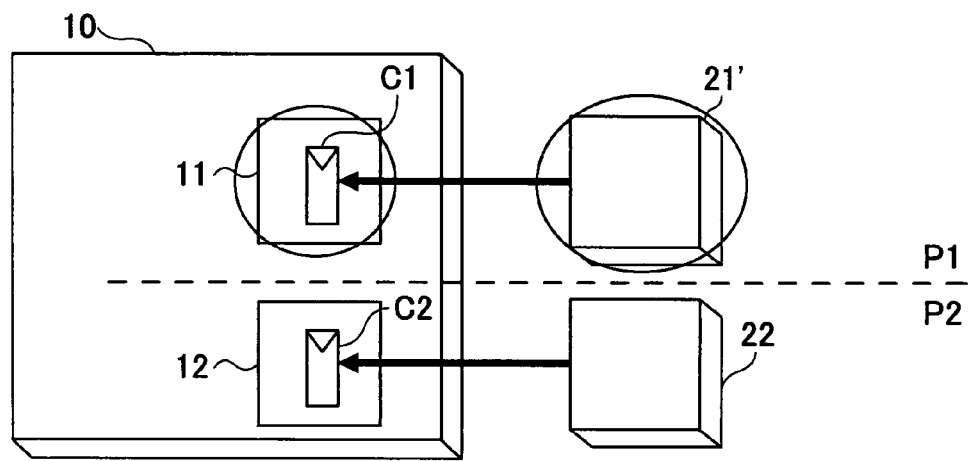

FIGS. 3A through 3C illustrate the concept of the embodiment of the present invention.

The same as the system of FIGS. 1A through 1C, as shown in FIG. 3A, two boards 21 and 22, belonging to respective different partitions P1 and P2, are connected to a crossbar switch 10. In ports 11 and 12, corresponding to the boards 21 and 22, respectively, special phase adjusting devices C1 and C2 are provided.

Then, when the board 21 is replaced by a new one as shown in FIG. 3B, a power off state of the board 21 to be replaced occurs for the replacement and then, is detected. In response to the detection, the phase adjustment state of the corresponding phase adjusting device C1 is initialized. Then, as shown in FIG. 3C, in the initial phase adjustment carried out when a new board 21' is connected, the phase adjustment state of the phase adjusting device C1 has been thus initialized as mentioned above. As a result, it is possible to effectively reduce a time required for the initial phase adjustment.

That is, in the embodiment of the present invention, in the computer system having the crossbar switch 10 to which the plurality of boards, i.e., the plurality circuits (which may be referred to as the plurality of information processing parts, hereinafter) 21 and 22 having respective different power supply systems, the phase adjusting devices C1 and C2 are provided in the crossbar switch 10 which provides an electrical connection between the plurality of information processing parts 21 and 22. Further, devices for separately detecting power supply on/off of the plurality of information processing parts 21 and 22 (referred to as the 'devices for detecting power supply on/off', hereinafter), respectively, are provided. The devices for detecting power supply on/off are connected further to devices (referred to as initializing devices, hereinafter) for initializing the phase adjustment states of the above-mentioned phase initializing devices C1 and C2, respectively. In this example, the initializing devices are actually included in the phase adjusting devices C1 and C2, respectively.

As a result, when power supply to the corresponding information processing part is cut upon corresponding board replacement or such, the above-mentioned device detecting power supply on/off detects the thus-occurring power supply off state of the information processing part, the fact that the information processing part has thus entered the power supply off state is thus transmitted to the initializing device of the corresponding phase adjusting device Cl, and thus, the phase adjustment state of the phase adjusting device C1 is initialized.

Figure 4:
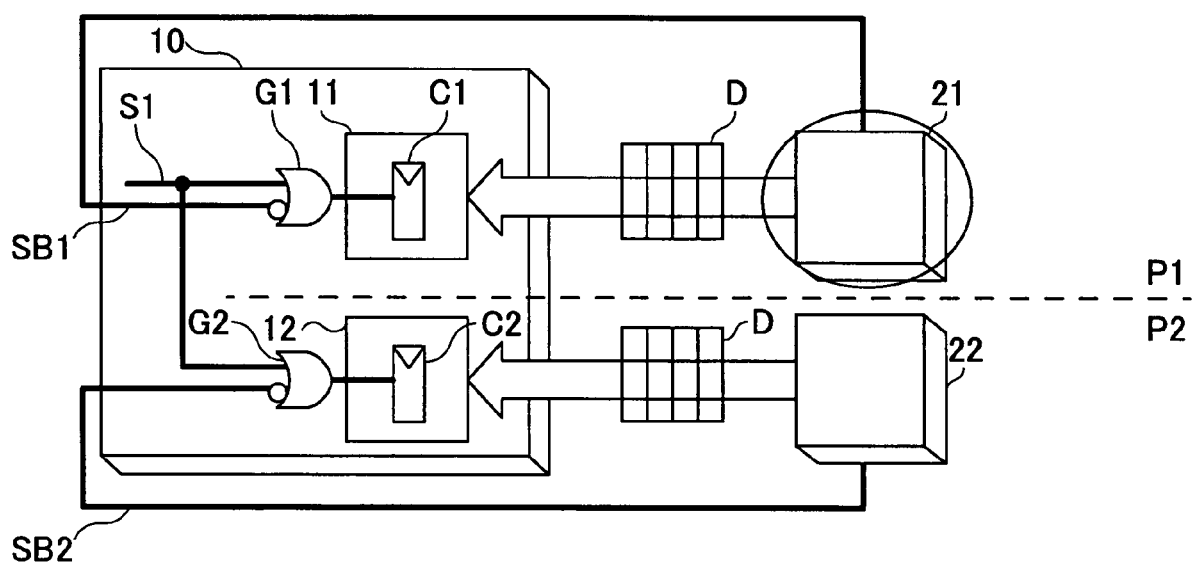

FIG. 4 also illustrates the concept of the embodiment of the present invention. As shown in FIG. 4, signal lines SB1 and SB2 (acting as power supply cut signal transmitting media) are provided for transmitting power supply off states of the respective boards 21 and 22 (simply referred to as 'power supply off detecting signal lines', hereinafter), which are connected to one input terminals of OR gates G1 and G2, provided for initializing the corresponding phase adjusting devices C1 and C2. To the other input terminals of the respective OR gates G1 and G2, the initializing signal line S1 for all the flip-flop circuit devices upon a power supply start of the crossbar switch body 10 is connected.

Thereby, in the respective phase adjusting devices C1 and C2, the initializing signal is supplied the respective initializing devices upon a power supply start of the crossbar switch body 10 itself, and thus, the respective phase adjusting devices C1 and C2 are forcibly initialized as in the related art shown in FIG. 2. Further, in the embodiment of the present invention shown in FIG. 4, when power supply to the information processing part 21 or 22 is cut, this state is detected and then another signal for initialization is provided to the corresponding initializing device via the corresponding one of the OR gate G1 or G2. As a result, the initializing device initializes the corresponding phase adjusting device C1 or C2 separately.

Further detailed descriptions of specific configurations of the above-mentioned phase adjusting device C1 and C2, the initializing devices therefor and the devices for detecting power supply on/off of the respective information processing parts 21 and 22 are omitted since well-known arts are available therefor. For example, as the phase adjusting devices C1 and C2, well-known arts of a DLL, a delay line, or such, may be applied.

Below, a computer system in an embodiment of the present invention will now be described. The computer system configured by a plurality of partitions, a plurality of information processing parts (i.e., the plurality of boards) are connected to a crossbar switch which has phase adjusting devices.

In a control of the related art, when board replacement is made in a condition where power supply to the crossbar switch body is kept alive, the phase adjustment state of the phase adjusting device in the port of the corresponding board is not initialized. As a result, a set value of the phase adjusting amount (i.e., the delay amount) of the phase adjusting device is not set in the medium value.

As a result, a time required for the initial phase adjustment may increase and thus, the work efficiency may degrade as mentioned above. In order to avoid such a situation, the power supply to the crossbar switch body may be cut, and thus, all the partitions included in the system may be interrupted as mentioned above in the related art. That is, by cutting power supply to the crossbar switch body itself, all the phase adjusting devices included therein are forcibly initialized, and thus, their set values of the phase adjusting amounts are forcibly set in the medium values, respectively. As a result, it is possible to reduce the time required for the initial phase adjustment.

However, in this method in the related art, operations of the partitions, not including the board to be replaced, are also interrupted due to the power supply cut, and such a situation is not preferable in view of total system operation, as mentioned above.

In contrast thereto, in a control method according to the embodiment of the present invention, only power supply to the partition including the board to be replaced is cut, while the power supply to the crossbar switch body itself is kept alive. As a result, only the port of the crossbar switch, to which the board to be replaced belongs enters a physical off-line state. This physical off-line state is detected, and thereby, the phase adjustment state of only the corresponding phase adjusting device is initialized.

As a result, only for the phase adjusting device corresponding to the board to be replaced, the set value of the phase adjusting amount is forcibly set in the medium value of the phase adjusting range. As a result, a time required for the initial phase adjustment is reduced.

In the control method according to the embodiment of the present invention, the initial phase adjustment made by the phase adjusting device of the port of the crossbar switch after the board replacement is thus carried out efficiently. As a result, it is possible to efficiently carry out the board replacement in a condition in which the power supply to the crossbar switch body itself is kept alive and thus, operations of the other partitions are kept continuous.

Figure 5:
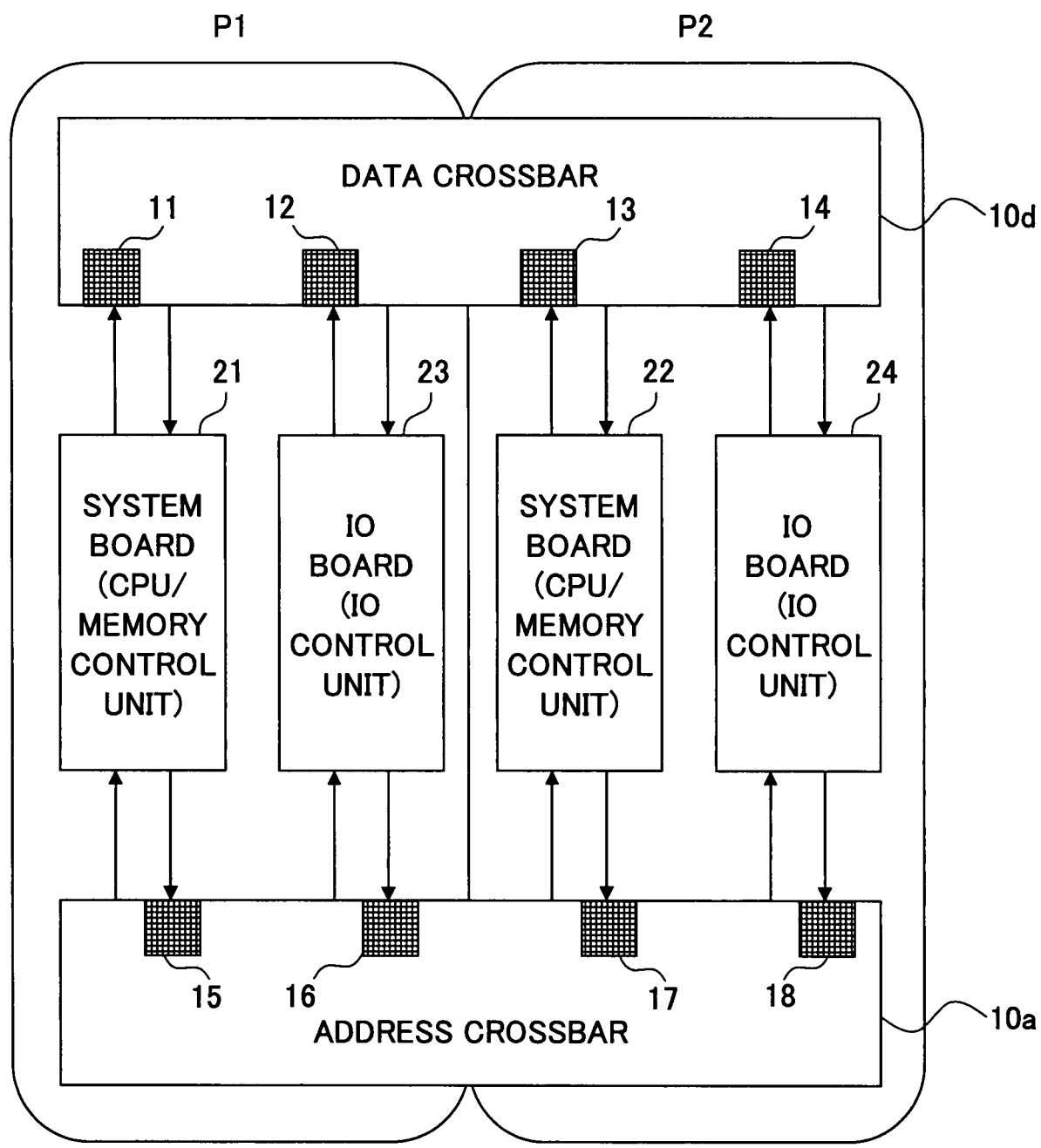
FIG. 5 illustrates a computer system in one embodiment of the present invention.

FIG. 5 shows a general configuration of the computer system in the embodiment of the present invention.

As shown in FIG. 5, the computer system has two partitions P1 and P2, to each of which separate business processing may be assigned. In these partitions P1 and P2, system boards 21 and 22, each having a CPU and a memory control unit in a form of LSI circuits, and IO boards 23 and 24, each including an IO (i.e., input/output) control unit in a form of a LSI circuit, are provided.

Further, in the computer system, a data crossbar switch 10d and an address crossbar switch 10a are provided to provide a function of mutually electrically connecting among these boards 21 through, 24. The data crossbar switch 10d is used to transmit data signals while the address crossbar switch 10a is used to transmit address signals, thereamong.

In this computer system, the CPUs included in the system boards 21 and 22 carry out predetermined business processing by accessing predetermined data stored in storage devices such as hard disk drives (not shown) via their own memory control units and the IO boards 23 and 24 connecting the respective storage devices. There, the data signals carrying data to be processed by the CPUs are transmitted by the data crossbar switch 10d, and the address signals carrying addresses of the storage devices, from/to which the data is read/written, are transmitted by the address crossbar switch 10a.

The respective crossbar switches 10d and 10a have receiving circuit parts 11, 12, 13, 14, 15, 16, 17 and 18 provided therein for receiving the data signals and the address signals from the boards 21 through 24 to take them. In each of these receiving circuit parts 11 through 18, the above-mentioned phase adjusting devices are provided, respectively.

In the configuration of FIG. 5, between the respective boards 21 through 24 and the corresponding phase adjusting devices, power supply off detecting signal lines and OR gates are provided. These power supply off detecting signal lines and the OR gates correspond to the power supply off detecting signal lines SB1 and SB2 and the OR gates G1 and G2, provided between the boards 21, 22 and the corresponding phase adjusting devices C1, C2, described above with reference to FIG. 4.

As a result, when the system board 21, for example, included in the partition P1 is replaced, and for this purpose, power supply to the board 21 is cut, this state transition to the power supply off state is transmitted to the corresponding receiving circuit parts 11 and 15 of the crossbar switches 10d and 10a by, means of the power supply off detecting signal lines. As a result, via the corresponding OR gates, the initializing devices of the phase adjusting devices provided in the respective receiving circuit parts 11 and 15 are started up. Thereby, the phase adjustment states of the phase adjusting devices of the respective receiving circuit parts 11 and 15 are initialized. In this occasion, power supply to the system board 22 and the IO board 24 included in the other partition P2 is kept alive.

After that, a new board 21' for the replacement is connected to the respective crossbar switches 10d and 10a , and power supply to the board 21' is started. At this time, the phase adjusting device of each of the receiving circuit parts 11 and 15 carries out the initial phase adjustment and receives the data/address signal and the clock signal transmitted from the board 21'. In the initial phase adjustment, since the phase adjustment state of the phase adjusting device of each of the receiving circuit parts 11 and 15 has been initialized as mentioned above, it is possible to efficiently reduce a time required in comparison to a case where the initial phase adjustment is carried out with no initialization of the phase adjustment state of the phase adjusting device, as mentioned above.

Figure 6:
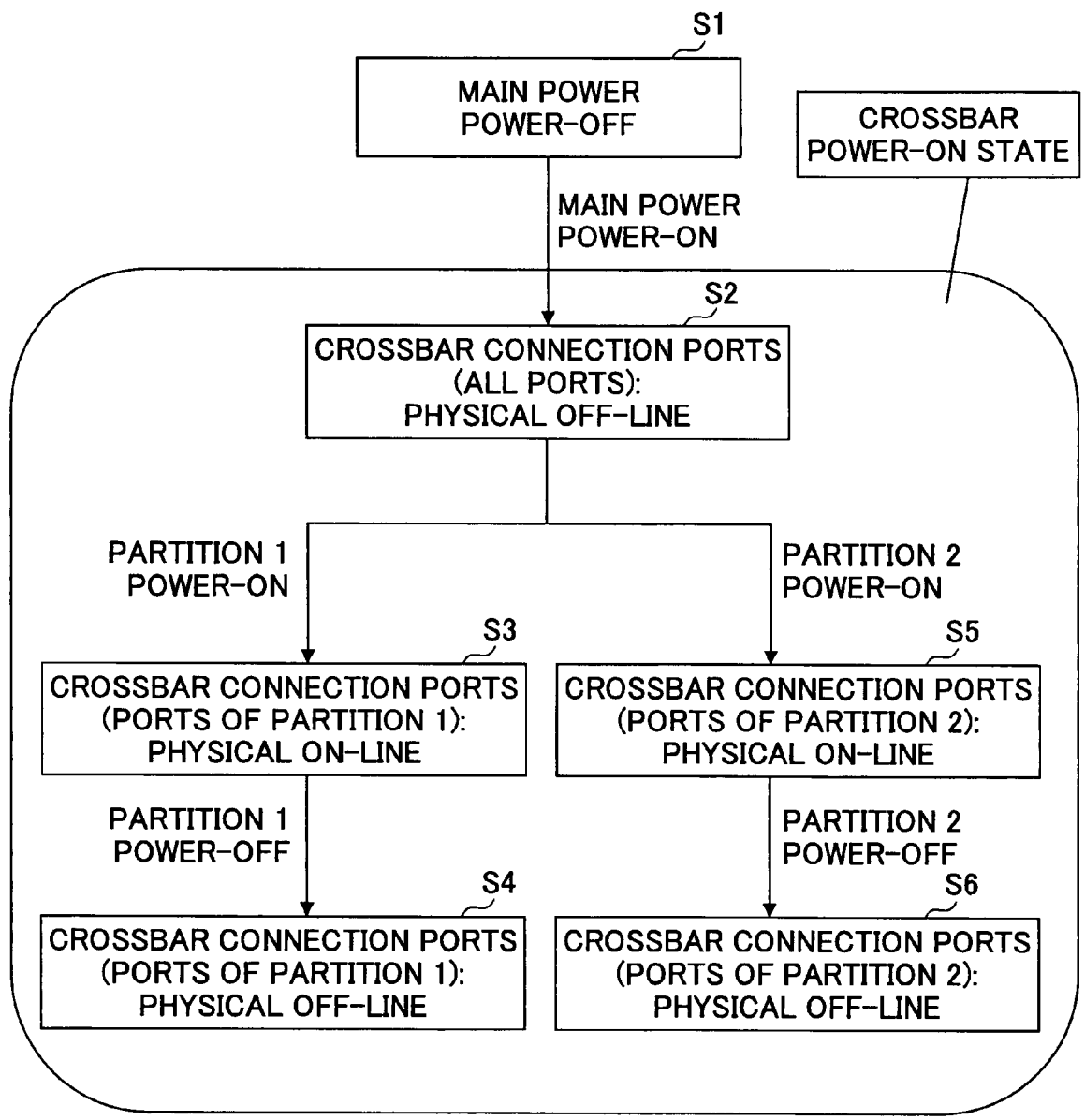
FIG. 6 illustrates a power supply control of a crossbar switch in the computer system in the embodiment of the present invention.

FIG. 6 shows an operation flow chart for illustrating a power supply control procedure of the crossbar switches 19d and 10a (generically referred to as a 'crossbar switch 10', hereinafter) in the computer system in the embodiment of the present invention described above with reference to FIG. 5.

In FIG. 6, in Step S1, it is assumed that main power supply has not been started yet in the computer system. After that, the main power supply is started and power supply to the crossbar switch 10 itself included in the computer system is started in Step S2. In this condition, after that, power supply can be started or cut for each of the partitions P1 and P2 (Steps S3, S4, S5 and S6).

That is, in the crossbar switch 10, it is possible to carry out a control such that, only power supply to the boards included in the partition P1 can be started (Step S3), or cut (Step S4). Similarly, in the crossbar switch 10, it is possible to carry out a control such that, only power supply to the boards included in the partition P2 can be started (Step S5) or cut (Step S6).

An occasion where a certain board included in any one of the partitions P1 and P2 should be replaced is assumed. In this case, for the corresponding partition, power supply is cut so that power supply to the board to be replaced is cut. As a result, this state transition is transmitted to the initializing device of the corresponding phase adjusting device, and thus, the initializing device initializes the phase adjusting device.

Thus, it is possible to carry out board replacement while power supply to the boards included in the other partition is kept alive, advantageously in view of total system operation. Further, only the phase adjustment state of the phase adjusting device of the partition corresponding to the board to be replaced is initialized, and thus, it is possible to effectively reduce a time required for the initial phase adjustment required for the board replaced after a start of power supply.

Figure 7:
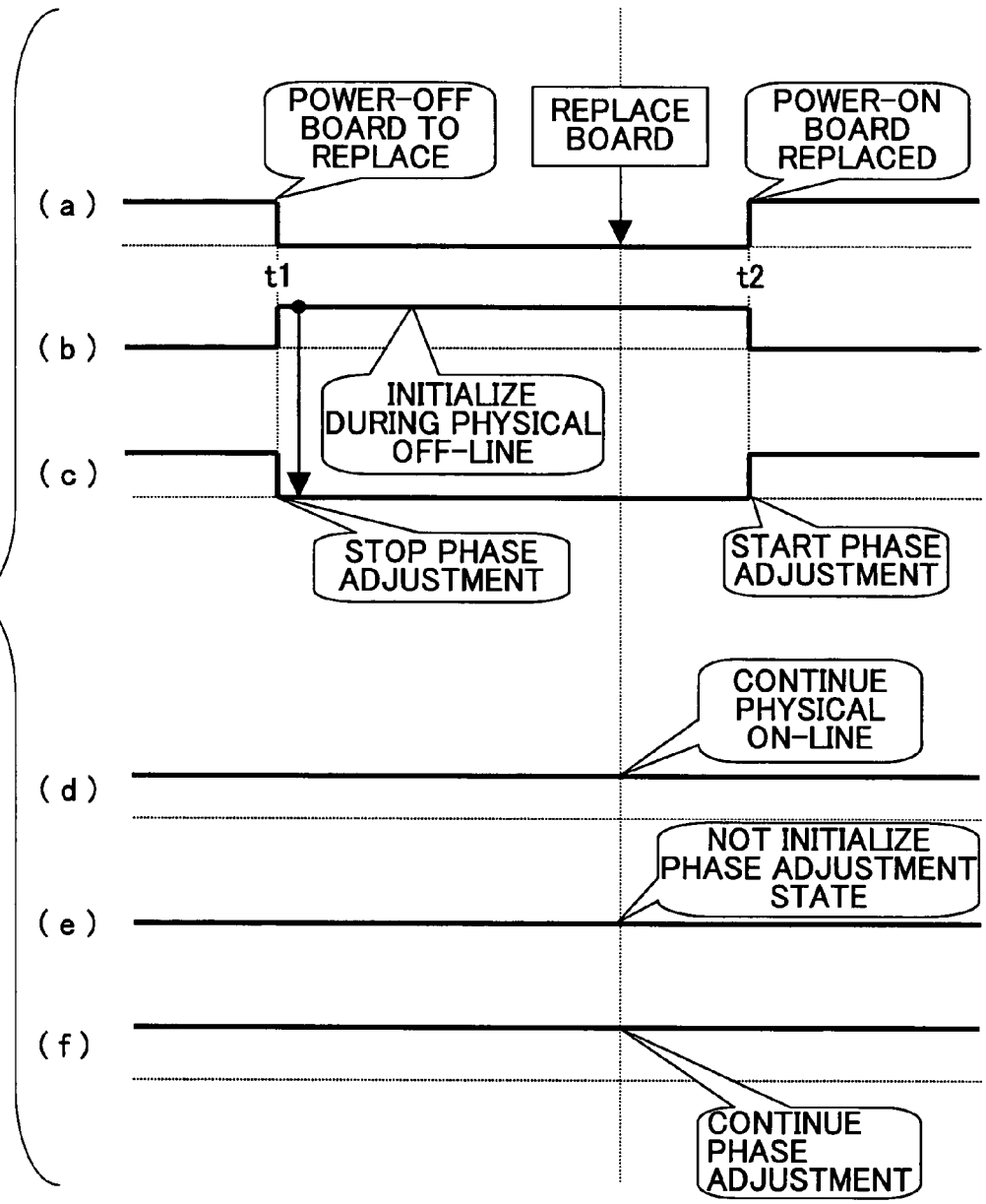
FIG. 7 shows a timing chart illustrating one example of a control method in the computer system according to the embodiment of the present invention.

FIG. 7 shows a timing chart for illustrating a control method for the phase adjusting device in the computer system according to the embodiment of the present invention.

FIG. 7(a) shows a physical on-line state of the partition to which the board to be replaced belongs, FIG. 7(b) shows an operation of initializing the phase adjustment state of the phase adjusting device belongs to the partition and FIG. 7(c) shows an actual phase adjusting operation carried out by the phase adjusting device.

Further, FIG. 7(d) shows a physical on-line state of the partition other than the above-mentioned partition to which the board to be replaced belongs, FIG. 7(e) shows an operation of initializing the phase adjustment state of the phase adjusting device belongs to the partition and FIG. 7(f) shows an actual phase adjusting operation carried out by the phase adjusting device.

In FIG. 7, power supply to the board to be replaced is cut at a time t1 for replacement. After that, a power supply off signal is transmitted to the port of the partition in the crossbar switch 10 corresponding to the board to be replaced through the above-mentioned power supply off detecting signal line. As a result of the power supply to the board being thus cut, the port of the partition enters the physical off-line state accordingly, as shown in FIG. 7(a). This state transition is thus transmitted to the initializing device of the phase adjusting device corresponding to the board to be replaced, by means of the above-mentioned power supply off signal through the above-mentioned power supply off detecting signal line. Then, the initializing device initializes the phase adjustment state of the phase adjusting device (FIG. 7(b)). This initializing operation is continued until the port of the partition to which the board to be replaced belongs returns to the physical on-line state.

Also at this time, the phase adjusting operation of the phase adjusting device is interrupted (FIG. 7(c)). This state that the phase adjusting operation of the phase adjusting device is interrupted is also continued until the port of the partition to which the board to be replaced belongs returns to the physical on-line state.

During this period, the board is replaced, after that in a time t2 power supply to the board connected to the port of the partition of the crossbar switch 10 is started, and thus, the physical on-line state is built with the board thus-replaced. This state transition is transmitted to the initializing device of the corresponding phase adjusting device of the crossbar switch 10 through the above-mentioned power supply off detecting signal line. As a result, the above-mentioned initializing operation of the initializing device is finished (FIG. 7(b)). Simultaneously, phase adjusting operation of the phase adjusting device is started (FIG. 7(c)).

During the time period of t1 through t2, as to the partition other than the partition corresponding to the board replacement, the physical on-line state is maintained between the ports and the boards connected thereto (FIG. 7(d)), no initialization is carried out in the corresponding phase adjusting devices in the crossbar switch 10 (FIG. 7(e)), and the phase adjusting operation is continued (FIG. 7(f)).

As a result, even during the board replacement, the functions of the boards belonging to the partition other than the partition corresponding to the board replacement are kept alive, and thus, the corresponding business processing operations are advantageously continued.

Figure 8:
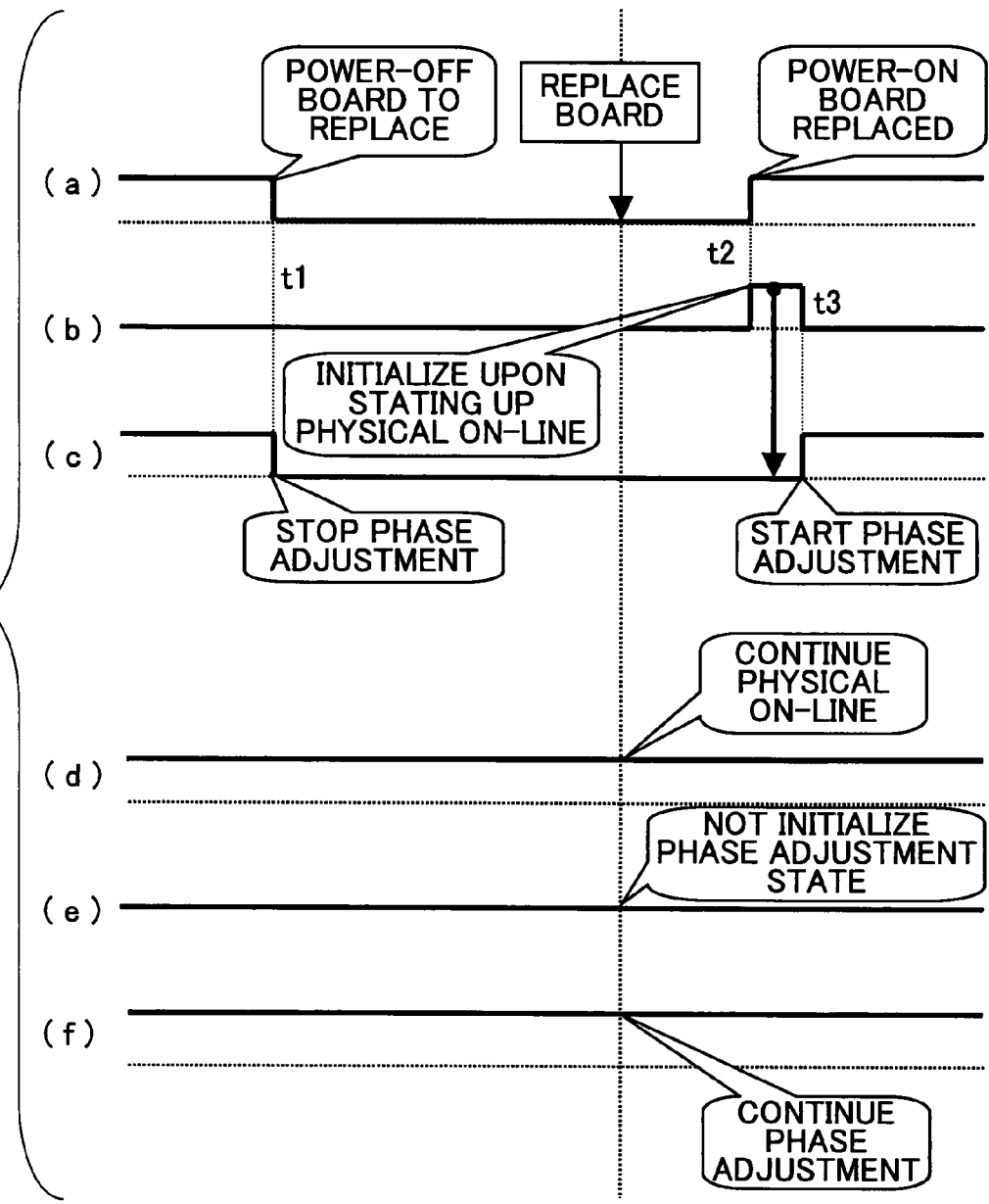
FIG. 8 shows a timing chart illustrating another example of a control method in the computer system according to the embodiment of the present invention.

FIG. 8 shows a timing chart for illustrating a control method for the phase adjusting device in a variant embodiment of the above-described embodiment of FIG. 7, according to the present invention.

In the example of FIG. 7, when power supply to the board is cut (time t1), the phase adjustment state of the phase adjusting device corresponding to the board to be replaced is initialized. In contrast thereto, according to the variant embodiment of FIG. 8, an initializing operation of the phase adjusting device is carried out after the completion of the board replacement in a condition in which power supply is kept alive. In this method, the initializing operation is carried out only in a moment when power supply is started again, and after that, no continuation of the initializing operation is made. Therefore, it is necessary to detect a rising up of a signal indicating the physical on-line signal of the corresponding port as a trigger to start up the initializing operation.

As to the contents the same as those of the embodiment of FIG. 7, the duplicate description is omitted.

In the method of FIG. 8, initialization of the phase adjusting device in the partition corresponding to the board of replacement is not carried out when power supply to the board is cut (time t1 of FIG. 8(b)). Instead, after the replacement of the board, the initialization is carried out when power supply to the board is started (time t2 of FIG. 8(b)).

In this case, the initializing operation of the phase adjusting device is carried out only in a moment (during a time period of t2 through t3 of FIG. 8(b)). After that, the phase adjustment operation of the phase adjusting device is started (FIG. 8 (c)).

The present invention is not limited to the above-described embodiments, and variations and modifications may be made without departing from the basic concept of the present invention claimed below.

The present application is based on Japanese Priority Application No. 2006-223279, filed on Aug. 18, 2006, the entire contents of which are hereby incorporated herein by reference.

What is claimed is:

1. An information processing apparatus comprising:
a plurality of information processing parts; and
a mutual electrically connecting part that mutually connects the plurality of information processing parts, wherein:
the mutual electrically connecting part comprises a plurality of phase adjusting parts each configured to adjust a phase with respect to a corresponding one of the plurality of information processing parts; and
the information processing apparatus further comprises:
a power supply cut signal transmitting medium that transmits a power supply cut signal, indicating that power supplied to one of the plurality of information processing parts is cut, to one of the plurality of phase adjusting parts corresponding to the one of the plurality of information processing parts; and
an initializing part that initializes the one of the plurality of phase adjusting parts, in response to the transmission of the power supply cut signal via the power supply cut signal transmitting medium.

2. The information processing apparatus as claimed in claim 1, wherein:
each of the plurality of information processing parts is configured as a detachable circuit board; and
cutting the power supply to the one of the plurality of information processing parts occurs when the detachable circuit board of the one of the plurality of information processing parts is detached.

3. The information processing apparatus as claimed in claim 1, wherein:
each of the plurality of phase adjusting parts is configured to adjust a phase relationship between a data signal and a timing signal received from a corresponding one of the plurality of information processing parts.

4. The information processing apparatus as claimed in claim 1, wherein:

the initializing part sets, as an initial value of a phase adjusting amount of the one of the plurality of phase adjusting parts, approximately a medium value in a phase adjusting range.

5. The information processing apparatus as claimed in claim 1, wherein:
the mutual electrically connecting part comprises a crossbar switch.

6. The information processing apparatus as claimed in claim 1, wherein:
each of the plurality of information processing parts is configured to execute separate information processing.

7. A control method for an information processing apparatus which comprises a plurality of information processing parts and a mutual electrically connecting part that mutually connects the plurality of information processing parts, the mutual electrically connecting part comprising a plurality of phase adjusting parts each configured to adjust a phase with respect to a corresponding one of the plurality of information processing parts, said method comprising:
transmitting a power supply cut signal, when power supplied to one of the plurality of information processing parts is cut, to one of the plurality of phase adjusting parts corresponding to the one of the plurality of information processing parts; and
initializing the one of the plurality of phase adjusting parts, in response to the transmitting of the power supply cut signal.

8. The control method as claimed in claim 7, wherein:
each of the plurality of information processing parts is configured as a detachable circuit board; and
cutting the power supply to the one of the plurality of information processing parts occurs when a circuit board of the one of the plurality of information processing parts is detached.

9. The control method as claimed in claim 7, wherein:
each of the plurality of phase adjusting parts is configured to adjust a phase relationship between a data signal and a timing signal received from a corresponding one of the plurality of information processing parts.

10. The control method as claimed in claim 7, wherein:
in the initializing, as an initial value of a phase adjusting amount of the one of the plurality of phase adjusting parts, approximately a medium value of a phase adjusting range is set.

11. An information processing apparatus comprising:
a mutual electrically connecting part to which a plurality of information processing parts are connected, wherein:
the mutual electrically connecting part comprises a plurality of phase adjusting parts each provided for a corresponding one of the plurality of information processing parts, and each configured to adjust a phase of a data reception from the corresponding one of the plurality of information processing parts; and
an initializing part configured to receive a power supply cut signal indicating that power supplied to one of the plurality of information processing parts is cut, and initialize one of the plurality of phase adjusting parts corresponding to the one of the plurality of information processing parts.

12. The information processing apparatus as claimed in claim 11, wherein:
a logic circuit is provided for inputting an initializing signal for initializing the one of the plurality of phase adjusting parts and the power supply cut signal; and
the one of the plurality of phase adjusting parts is initialized according to an output of the logic circuit.

13. The information processing apparatus as claimed in claim 12, wherein:
the logic circuit comprises a logical OR gate.

* * * * *